Aug. 9, 1932.  A. S. PIERCE  1,870,742
INFLATION INDICATOR FOR TIRES
Filed Nov. 23, 1931
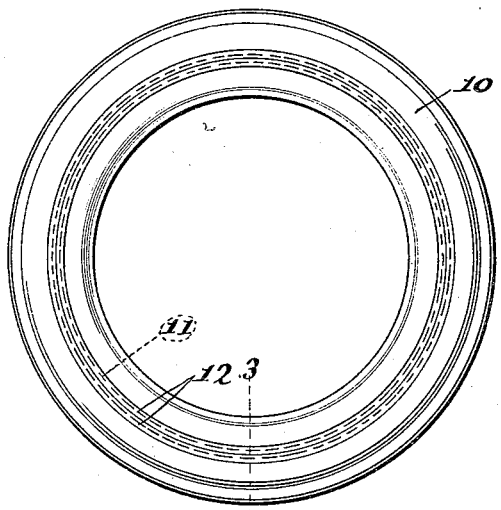
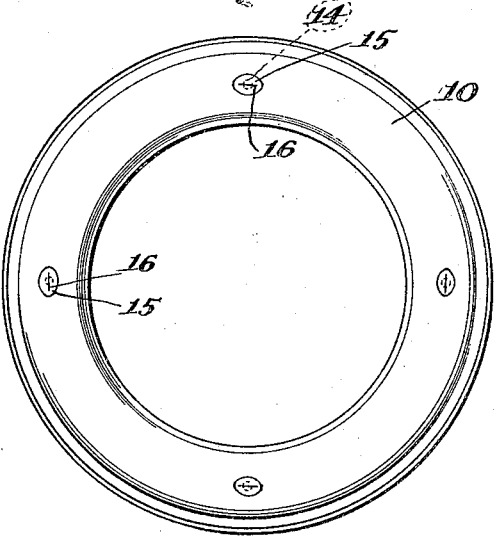
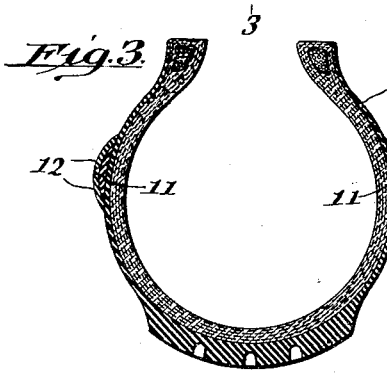
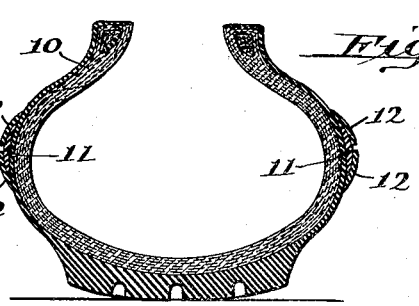
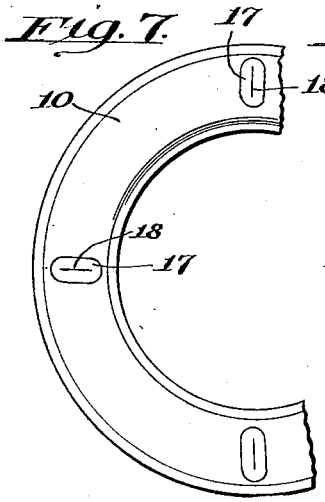
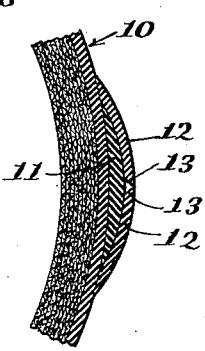
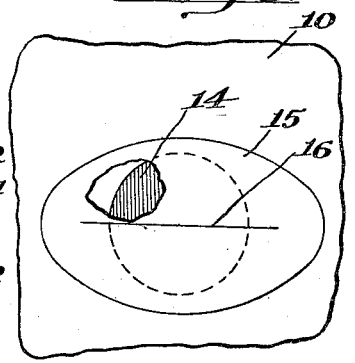
Inventor
Amy S. Pierce.
By Martin P. Smith
Attorney Patented Aug. 9, 1932

1,870,742

UNITED STATES PATENT OFFICE

AMY S. PIERCE, OF LOS ANGELES, CALIFORNIA

INFLATION INDICATOR FOR TIRES

Application filed November 23, 1931. Serial No. 576,694.

My invention relates generally to pneumatic tires and more particularly to means carried by the external surface of a vehicle tire casing for indicating underinflation of the tube within the casing, and the principal object of my invention is, to provide relatively simple, practical and efficient means that is formed integral with or permanently secured to the external surfaces of the side walls of a tire casing and which means will act automatically, when the pressure within the pneumatic tube drops below normal, to display a readily visible mark, thereby serving as a warning to the operator of the vehicle that the tire is underinflated and that inflation service is required.

Further objects of my invention are, to provide a pneumatic tire underinflation indicator that is relatively simple in construction, inexpensive of manufacture and which is positive in action due to the fact that it automatically functions as a result of distortion of the walls of the casing by reason of below normal pressures within the tube that occupies the casing.

With the foregoing and other objects in view, my invention consists in certain novel features of construction and arrangement of parts that will hereinafter be more fully described and claimed and illustrated in the accompanying drawing, in which:

Fig. 1 is a side elevational view of a casing constructed in accordance with my invention and provided on the outer face of its side wall with one form of the underinflation indicator as contemplated by my invention.

Fig. 2 is a side elevational view of a casing provided with a modified form of the underinflation indicating device.

Fig. 3 is an enlarged cross section taken on the line 3—3 of Fig. 1 and showing the position occupied by the casing while the enclosed tube is inflated to the proper degree.

Fig. 4 is a cross sectional view of the casing distorted as a result of underinflation.

Fig. 5 is an enlarged detail section of a portion of the side wall of the casing and showing the indicating device in normal position.

Fig. 6 is an enlarged detail section similar to Fig. 5 and showing the side wall of the casing distorted and with the indicator in position to indicate underinflation of the tube.

Fig. 7 is an elevational view of a portion of a tire with a modified form of the indicator thereon.

Fig. 8 is an enlarged elevational view of a modified form of the underinflation indicating device.

Referring by numerals to the accompanying drawing which illustrates a practical embodiment of my invention, 10 designates the casing of a conventional pneumatic tire and arranged on the outer faces of the intermediate portions of the side walls of said casing are circumferentially disposed strips 11 of suitable material, preferably rubber. These strips when formed of rubber, are permanently secured to the side walls of the casing in any suitable manner, but preferably by being vulcanized thereto and said strips are vulcanized or cured so that they are somewhat harder and therefore have a greater degree of rigidity than the side walls of the casing. These strips may be formed of distinctively colored material, for instance, red or white, or their outer faces or narrow strip between their edges may be distinctively colored.

A pair of continuous strips 12 of rubber are secured in any suitable manner, preferably by vulcanizing directly to the outer face of each strip 11 and the inner edges of these strips meet at a point directly over the center of the underlying strip 11. The meeting edges of these strips 12 are undercut or beveled as designated by 13, thereby forming, under normal conditions, a substantially triangular chamber between said inner edges and the central portion of the outer face of strip 11 so that a substantial portion of the outer face of said strip 11 is exposed when the edges 13 are spread apart.

I prefer to form the strips 12 from rubber that is vulcanized to approximately the same degree as the rubber in the body of the casing and thus the rubber in said strips has a greater degree of flexibility and elasticity than the rubber or material of which strip 11 is formed.

When the inflatable tube within the casing that is equipped with my improved indicating means, is inflated to the proper degree, said casing has the normal shape as illustrated in Figs. 3 and 5 and under such conditions the outer ends of the beveled edges 13 of the strips 12 are in direct contact with each other so as to entirely cover that portion of the face of strip 11 between said beveled edges.

Under such conditions the driver of the vehicle having tires that are equipped with my improved indicating means will understand by merely glancing at the tire casings that the tires are properly inflated.

In the event that the tire is underinflated or that sufficient air leaks from the tire to permit a partial collapse thereof, the lower portion of the tire or that portion resting upon the ground, will assume practically the distorted form as illustrated in Fig. 4 and as a result of the movement of the tread portion of the casing toward the rim, the side walls of the casing will be distended.

As a result of this distortion those portions of the side walls of the casing directly above and below the strips 11 will bend or curve abruptly inward, thereby imparting pulling strains to the flexible overlying strips 12 so that the beveled edges thereof will be pulled apart as illustrated in Fig. 6 and as a result the distinctively colored outer face of that portion of strip 11 that is directly above that portion of the casing that is in contact with the roadway, will be exposed and the operator of the vehicle, noting this exposure of the distinctively colored surface of strip 11, will be warned that the tire requires inflation service.

In Figs. 2 and 8 I have illustrated in modified form of the indicating means and in this construction discs 14 of distinctively colored material, preferably rubber, are applied to the outer faces of the side walls of a tire casing at a plurality of points in the circumference thereof and overlying these distinctively colored discs are sections 15 of rubber each provided with a longitudinally disposed slit 16 and the edges of said slit are inclined or beveled in the same arrangement as the beveled edges 13 on the strips 12.

In the modified construction illustrated in Fig. 7 radially disposed strips or sections 17 of rubber are provided with slits 18 and which latter spread apart under distortion of the side walls of the casing so as to expose underlying distinctively colored spots on the side walls of the casing.

The strips 11 and 12 or the discs 14 and sections 15 in addition to providing simple and efficient means for automatically indicating the properly inflated or underinflated condition of a pneumatic tire, provides an effective and desirable guard or reenforcement to protect the side walls of the tire from injury as a result of frictional contact with curbs or the like.

While I have shown and described the indicating means located on the intermediate portions of the side walls of the casing and which location is most desirable for the reason that the side walls of the casing are distorted to a greater degree than any other portion of the casing when the tube within the casing is underinflated, it will be understood that my invention comprehends the location of the indicating means at any suitable point upon the casing where it will successfully operate and may be readily observed. Further, while I have herein described the indicator as being formed integral with the tire casing, the parts of the indicator may be separately produced and marketed as an accessory, in which event the indicating devices are applied for use on casings and permanently secured thereto by a suitable adhesive or by vulcanizing in practically the same manner that a patch is vulcanized to an inner tube.

Thus it will be seen that I have provided a pneumatic tire inflation and underinflation indicating device that is relatively simple in construction, inexpensive of manufacture and very effective in performing the functions for which it is intended.

It will be understood that minor changes in the size, form and construction of the various parts of my improved underinflation indicator for tires may be made and substituted for those herein shown and described without departing from the spirit of my invention, the scope of which is set forth in the appended claims.

I claim as my invention:

1. The combination with a pneumatic tire casing, of thin sections of resilient material secured to the outer faces of the side walls of the casing, each section of material being provided with a slit and the edges adjacent to said slit being beveled inwardly.

2. The combination with a pneumatic tire casing, of thin sections of resilient material secured to the outer faces of the side walls of the casing, each section of material being provided with a slit, the edges adjacent to said slit being beveled inwardly and that portion of the surface of the casing beneath the beveled edges of said slit being distinctively colored.

3. The combination with a pneumatic tire casing, of a section of distinctively colored material secured to the outer face of the side wall of the casing, a section of resilient material secured to the side wall of the casing and overlying said first mentioned section of material, said overlying section of material being provided with a slit having inwardly beveled edges.

4. The combination with a pneumatic tire casing provided on the outer face of its side wall with a distinctively colored area, of a section of resilient material overlying said distinctively colored area and said overlying section of material being provided with a slit which when opened exposes the underlying distinctively colored area.

5. The combination with a pneumatic tire casing provided on the outer face of its side wall with a distinctively colored area, of a section of resilient material secured to the side wall of the casing and overlying said distinctively colored area and said section of overlying material being provided with a slit having inwardly beveled edges.

6. The combination with a pneumatic tire casing, of a section of distinctively colored material secured to the outer face of the side wall of the casing, a section of material secured to the outer face of the side wall of the casing and overlying the distinctively colored section of material, said overlying section of material having a greater degree of flexibility than the distinctively colored section of material and said overlying section of material having a slit that opens under distortion of the casing.

7. The combination with a pneumatic tire casing, of a section of distinctively colored material secured to the outer face of the side wall of the casing, a section of material secured to the outer face of the side wall of the casing and overlying the distinctively colored sections of materials, said overlying sections of material having a greater degree of flexibility than the distinctively colored sections of material, said overlying section of material having a slit that opens under distortion of the casing and the edges of said slit being beveled inwardly.

8. In an inflation indicator for pneumatic tires, a distinctively colored member adapted to be secured to the casing of the tire, a member formed of elastic material secured to the tire casing and overlying said distinctively colored member and said member of elastic material being provided with a slit.

9. In an inflation indicator for pneumatic tires, a distinctively colored member adapted to be secured to the casing of the tire, a member formed of elastic material secured to the tire casing and overlying said distinctively colored member, said member of elastic material being provided with a slit and the edges of which slit are inclined inwardly toward the distinctively colored member.

10. An inflation indicator for pneumatic tires comprising a member adapted to be secured to the casing of the tire, the outer face of which member is distinctively colored, a member formed of elastic material adapted to be secured to the casing and to overlie the member having the colored outer face and said overlying elastic member being provided with a slit.

11. An inflation indicator for pneumatic tires comprising a member adapted to be secured to the casing of the tire, the outer face of which member is distinctively colored, a member formed of elastic material adapted to be secured to the casing and to overlie the member having the colored outer face, said overlying elastic member being provided with a slit, the edges of which are inclined inwardly toward the colored face of the underlying member.

In testimony whereof, I affix my signature.

AMY S. PIERCE.